(12) United States Patent
Ma et al.

(10) Patent No.: US 10,305,366 B2
(45) Date of Patent: May 28, 2019

(54) POWER CONVERTER, A CONTROLLER AND A SYSTEM

(71) Applicant: Huawei Technologies Co., Ltd., Shenzhen (CN)

(72) Inventors: Jun Ma, Shenzhen (CN); Cicero Da Silveira Postiglione, Kista (SE); Grover Victor Torrico-Bascopé, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/149,739

(22) Filed: Oct. 2, 2018

(65) Prior Publication Data
US 2019/0036440 A1 Jan. 31, 2019

Related U.S. Application Data

(63) Continuation of application No. PCT/EP2016/057624, filed on Apr. 7, 2016.

(51) Int. Cl.
*H02M 3/158* (2006.01)
*H02M 1/08* (2006.01)
(Continued)

(52) U.S. Cl.
CPC ............ *H02M 1/08* (2013.01); *H02M 1/083* (2013.01); *H02M 1/42* (2013.01); *H02M 3/158* (2013.01);
(Continued)

(58) Field of Classification Search
CPC ........... H02M 1/42; H02M 7/46; H02M 3/158
See application file for complete search history.

(56) References Cited

U.S. PATENT DOCUMENTS

| 7,843,186 B2 * | 11/2010 | Nishida ................ | H02M 3/158 323/222 |
| 2010/0134080 A1 * | 6/2010 | Ouyang ................ | H02M 3/158 323/282 |

(Continued)

FOREIGN PATENT DOCUMENTS

| WO | 2009040691 A2 | 4/2009 |
| WO | 2014170409 A1 | 10/2014 |

OTHER PUBLICATIONS

Su et al., "Totem-Pole Boost Bridgeless PFC Rectifier With Simple Zero-Current Detection and Full-Range ZVS Operating at the Boundary of DCM/CCM", IEEE Transactions on Power Electronics, vol. 26, No. 2, pp. 427-435, XP011334721, Institute of Electrical and Electronics Engineers, New York, New York (Feb. 2011).

(Continued)

*Primary Examiner* — Matthew V Nguyen
*Assistant Examiner* — Ishrat F Jamali
(74) *Attorney, Agent, or Firm* — Leydig, Voit & Mayer, Ltd.

(57) ABSTRACT

The disclosure relates to a controller for a power converter, the power converter comprising a first switch and a second switch, wherein the controller is configured to receive a first control signal based on a first drain-to-source voltage of the first switch; receive a second control signal based on a second drain-to-source voltage of the second switch; derive a first switch control signal based on the first control signal and control the first switch by providing the first switch control signal to the first switch; derive a second switch control signal based on the second control signal and control the second switch by providing the second switch control signal to the second switch; wherein the first switch control signal and the second switch control signal each comprises turn-on edges and turn-off edges. Furthermore, disclosure (Continued)

also relates to corresponding methods, a non-transitory computer readable medium.

10 Claims, 13 Drawing Sheets

(51) Int. Cl.
*H02M 7/217* (2006.01)
*H02M 1/42* (2007.01)
*H02M 7/46* (2006.01)
*H02M 1/00* (2006.01)

(52) U.S. Cl.
CPC ............. *H02M 7/217* (2013.01); *H02M 7/46* (2013.01); *H02M 2001/0058* (2013.01)

(56) References Cited

U.S. PATENT DOCUMENTS

2010/0277954 A1* 11/2010 Charych .............. H02J 7/0016
363/21.1
2015/0180330 A1   6/2015 Ye et al.

OTHER PUBLICATIONS

Marxgut et al., "Interleaved Triangular Current Mode (TCM) Resonant Transition, Single Phase PFC Rectifier with High Efficiency and High Power Density," The 2010 International Power Electronics Conference, 2010 Institute of Electrical and Electronics Engineers, New York, New York (2010).

* cited by examiner

POWER CONVERTER, A CONTROLLER AND A SYSTEM

CROSS-REFERENCE TO RELATED APPLICATIONS

This application is a continuation of International Application No. PCT/EP2016/057624, filed on Apr. 7, 2016, the disclosure of which is hereby incorporated by reference in its entirety.

TECHNICAL FIELD

The embodiments of the present invention relate to a controller, a power converter and a system. Furthermore, the embodiments of the present invention also relate to corresponding methods, a non-transitory computer readable medium.

BACKGROUND

A power converter is typically used for converting electrical energy from an input voltage to an output voltage, e.g. converting from AC to DC voltage, converting from a higher voltage to a lower voltage or converting from a lower voltage to a higher voltage. A switched power converter may operate in various operation modes, e.g. in continuous conduction mode (CCM), discontinuous conduction mode (DCM) or in critical conduction mode (CRM). The power converter, such as a boost power converter, typically comprises an energy transfer inductor. The inductor is typically coupled to a boost switch and a freewheeling switch. The activation/turning-on or deactivation/turning-off of the boost switch and the activation/turning-on or deactivation/turning-off freewheeling switch is typically controlled by switch control signals comprising turning-on/turning-off timing. The switches form a complementary pair and are excluded from being turned-on simultaneously, i.e. when the boost switch is turned-on the freewheeling switch is not turned-on, or vice versa.

Various conventional techniques typically use a processor, such as a digital signal processor (DSP), to determine switch control signal timing, e.g. timing of turn-on edges and turn-off edges, and/or a programmable logical circuit, such as a field-programmable gate array (FPGA), to produce or derive the switch control signals, e.g. Pulse-Width Modulation (PWM) signals. Determining switch control signal timing, in some implementations, typically involve on-line determination by solving mathematical equations, which impose a quite heavy computational load, or off-line determination by accessing a pre-calculated look-up-table, which leads to a reduced switch control signal accuracy, and thus reduced power conversion performance.

SUMMARY

Embodiments of the present invention provide a solution which mitigates or solves the drawbacks and problems of conventional solutions. A further objective of embodiments of the embodiments of the present invention is to provide a solution for a power converter which operates whilst controlled under at least critical conduction mode (CRM). The above objectives are solved by the subject matter of the independent claims. Further advantageous implementation forms of the embodiments of the present invention can be found in the dependent claims.

According to a first aspect of the disclosure, the above mentioned and other objectives are achieved with a controller for a power converter, the power converter comprising a first switch and a second switch, wherein the controller is configured to: receive a first control signal based on a first drain-to-source voltage of the first switch; receive a second control signal based on a second drain-to-source voltage of the second switch; derive a first switch control signal based on the first control signal and control the first switch by providing the first switch control signal to the first switch; derive a second switch control signal based on the second control signal and control the second switch by providing the second switch control signal to the second switch; wherein the first switch control signal and the second switch control signal each comprises turn-on edges and turn-off edges.

Advantages of a controller according to the first aspect includes at least reduced complexity and improved efficiency of the control of the power converter, e.g. under CRM operation. Yet an advantage is that power converter accuracy is improved. Yet an advantage is that delay of switch control signal timing is substantially eliminated or reduced, which improves power converter performance. Thus, the controller according to the first aspect provides a simple, effective and reliable solution compared to conventional solutions.

In a first possible implementation form of a controller according to the first aspect, the controller is further configured to derive the turn-on edges of the first switch control signal based on trigger-on edges of the first control signal, and derive the turn-on edges of the second switch control signal based on trigger-on edges of the second control signal.

An advantage of the first implementation form is that switch control signal timing is improved. The advantage is achieved, e.g. by identifying switch timing achieving Zero Voltage Switching. Thus, further improving power conversion efficiency and reducing power loss in the power converter. This is achieved by deriving turn-on edges of switch control signals based on trigger-on edges of control signals indicating the actual state of the power converter, indicated by the drain-to-source voltages of the first and second switch.

In a second possible implementation form of a controller according to the first implementation form of the first aspect or the first aspect as such, the controller is further configured to
derive an additional first control signal and an additional second control signal based on an input voltage $V_{in}$ and an output voltage $V_{out}$ of the power converter, derive at least one turn-on edge of the first switch control signal based on the first in time of the trigger-on edge of the first control signal or the trigger-on edge of the additional first control signal, and derive at least one turn-on edge of the second switch control signal based on the first in time of the trigger-on edge of the second control signal or the trigger-on edge of the additional second control signal.

This implementation form has the advantage of further improving switch control signal reliability or redundancy by generating an additional switch control signal, as a backup signal, and selecting the first in time of the switch control signal timing based on the drain-to-source voltages and the additional switch control signal timing.

In a third possible implementation form of a controller according to the second implementation form of the first aspect, the controller is further configured to derive the turn-on edges of the additional first control signal and the turn-on edges of the additional second control signal based on a turn-off-time delay $T_{off\_m}$.

An advantage of the third implementation form is that switch control signal timing is improved by reducing the probability that the additional switch control signal timing is used when a valid switch control signal timing based on the drain-to-source voltages is available. This is achieved by delaying the turn-on edges of the additional control signals based on a prolonged turn-off-time delay $T_{off\_m}$.

In a fourth possible implementation form of a controller according to the third implementation form of the first aspect, the controller is further configured to determine the turn-off-time delay $T_{off\_m}$ based on a predetermined turn-on-time $T_{on}$ and/or a predetermined turn-off-time $T_{off}$.

An advantage of the fourth implementation form is that improved redundancy is achieved. A further advantage of the fourth implementation form is that switch control signal timing is further improved by reducing the probability that the additional switch control signal timing is used when a valid switch control signal timing is available. This is achieved by prolonging the off time of the switch acting as a boost switch.

In a fifth possible implementation form of a controller according to the fourth implementation form of the first aspect, the turn-off-time delay $T_{off\_m}$ is determined according to the formula $$T_{off\_m}=T_{off}*\mu,\ \mu>1,$$

where the predetermined turn-off-time $T_{off}$ is determined according to the formula $$T_{off} = T_{on} * \frac{V_{in}}{(V_{out} - V_{in})}.$$

An advantage of the fifth implementation form is that improved redundancy is achieved. A further advantage of the fifth implementation form is that switch control signal timing is further improved by reducing the probability that the additional switch control signal timing is used when a valid switch control signal timing is available. This is achieved by prolonging the off time of the switch acting as a boost switch based on the turn-off-time $T_{off}$ prolonged by a factor $\mu$, where the factor $\mu$ is greater than one.

In a sixth possible implementation form of a controller according to the fourth implementation form or the fifth implementation form of the first aspect, the controller is further configured to derive at least one turn-off edge of the first switch control signal based on a trigger-on edge of the first control signal and the predetermined turn-on-time $T_{on}$ when the first switch is configured to act as the boost switch, and derive at least one turn-off edge of the second switch control signal based on a trigger-on edge of the second control signal and the predetermined turn-on-time $T_{on}$ when the second switch is configured to act as the boost switch.

An advantage of the sixth implementation form is that the desired output voltage is provided at the output.

In a seventh possible implementation form of a controller according to any of the second implementation form to the sixth implementation form of the first aspect, the controller is further configured to receive a third control signal based on an inductor current of an inductor of the power converter; derive at least one turn-off edge of the first switch control signal based on first in time of a trigger-off edge of the third control signal and a trigger-off edge of the additional first control signal when the first switch is configured to act as the freewheeling switch; derive at least one turn-off edge of the second switch control signal based on first in time of a trigger-off edge of the third control signal and a trigger-off edge of the additional second control signal when the second switch is configured to act as the freewheeling switch.

An advantage of the seventh implementation form is that Zero Voltage Switching (ZVS) conditions for subsequently turning on the boost switch is provided by charging the inductor to a predetermined level, e.g. a level sufficient to discharge a boost switch capacitor. The boost switch is then able to turn on at ZVS. The boost switch turn-on edge, arriving or occurring after the derived turn-off edge, is then timed correctly to achieve ZVS switching.

According to a second aspect of the disclosure, the above mentioned and other objectives are achieved with a method for a controller, the method comprising:
receiving a first control signal based on a first drain-to-source voltage of a first switch;
receiving a second control signal based on a second drain-to-source voltage of a second switch;
deriving a first switch control signal based on the first control signal and controlling the first switch by providing the first switch control signal to the first switch;
deriving a second switch control signal based on the second control signal and controlling the second switch by providing the second switch control signal to the second switch, wherein the first switch control signal and the second switch control signal each comprises turn-on edges and turn-off edges.

In a first possible implementation form of a method according to the second aspect, the method further comprising deriving the turn-on edges of the first switch control signal based on trigger-on edges of the first control signal, and deriving the turn-on edges of the second switch control signal based on trigger-on edges of the second control signal.

In a second possible implementation form of a method according to the first implementation form of the second aspect or the second aspect as such, the method further comprising
deriving an additional first control signal and an additional second control signal based on an input voltage $V_{in}$ and the output voltage $V_{out}$ of the power converter, deriving at least one turn-on edge of the first switch control signal based on the first in time of the trigger-on edge of the first control signal or the trigger-on edge of the additional first control signal, and deriving at least one turn-on edge of the second switch control signal based on the first in time of the trigger-on edge of the second control signal or the trigger-on edge of the additional second control signal.

In a third possible implementation form of a method according to the second implementation form of the second aspect, the method further comprising deriving the turn-on edges of the additional first control signal and the turn-on edges of the additional second control signal based on a turn-off-time delay $T_{off\_m}$.

In a fourth possible implementation form of a method according to the third implementation form of the second aspect, the method further comprising determining the turn-off-time delay $T_{off\_m}$ based on a predetermined turn-on-time $T_{on}$ and/or a predetermined turn-off-time $T_{off}$.

In a fifth possible implementation form of a method according to the fourth implementation form of the second aspect, the turn-off-time delay $T_{off\_m}$ is determined according to the formula $$T_{off\_m}=T_{off}*\mu,\ \mu>1,$$

where the predetermined turn-off-time $T_{off}$ is determined according to the formula $$T_{off} = T_{on} * \frac{V_{in}}{(V_{out} - V_{in})}.$$

In a sixth possible implementation form of a method according to the fourth implementation form of the second aspect or the fifth implementation form of the second aspect, the method further comprising deriving at least one turn-off edge of the first switch control signal based on a trigger-on edge of the first control signal and the predetermined turn-on-time $T_{on}$ when the first switch is configured to act as the boost switch, and deriving at least one turn-off edge of the second switch control signal based on a trigger-on edge of the second control signal and the predetermined turn-on-time $T_{on}$ when the second switch is configured to act as the boost switch.

In a seventh possible implementation form of a method according to any of the second implementation form to the sixth implementation form of the second aspect, the method further comprising receiving a third control signal based on an inductor current of an inductor of the power converter; deriving at least one turn-off edge of the first switch control signal based on first in time of a trigger-off edge of the third control signal and a trigger-off edge of the additional first control signal when the first switch is configured to act as the freewheeling switch; deriving at least one turn-off edge of the second switch control signal based on first in time of a trigger-off edge of the third control signal and a trigger-off edge of the additional second control signal when the second switch is configured to act as the freewheeling switch.

The advantages of the methods according to the second aspect are the same as those for the corresponding device claims according to the first aspect.

According to a third aspect of the disclosure, the above mentioned and other objectives are achieved with a computer program with a program code for performing a method according to any implementation form of the second aspect when the computer program runs on a computer. Wherein the computer program, characterized in code means, which when run by processing means causes said processing means to execute any method according to the embodiments of the present invention. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

The advantages of the computer program according to the third aspect are the same as those for the corresponding device claims according to the first aspect.

According to a fourth aspect of the disclosure, the above mentioned and other objectives are achieved with a power converter comprising an input configured to receive an input voltage $V_{in}$ and an output configured to provide an output voltage $V_{out}$; an inductor coupled to a first switch and a second switch, wherein the first switch is configured to act as a freewheeling switch when the second switch is configured to act as a boost switch, or vice versa; a first trigger configured to generate a first control signal based on a first drain-to-source voltage of the first switch and to send the first control signal to a controller, a second trigger configured to generate a second control signal based on a second drain-to-source voltage of the second switch and to send the second control signal to the controller; wherein the first switch is further configured to be controlled by a first switch control signal received from the controller, and wherein the second switch is further configured to be controlled by a second switch control signal received from the controller.

An advantage of a power converter according to the fourth aspect is reduced complexity and improved efficiency of the control of the power converter, e.g. under CRM operation. Yet an advantage of the fourth aspect is that power converter accuracy is improved by a controller with reduced complexity and cost of production. Yet an advantage is that the power conversion performance is improved by substantially eliminate or clearly reduce any delay of the switch control signal timing.

In a first possible implementation form of a power converter according to the fourth aspect, the first trigger comprises a first comparator configured to generate the first control signal if the first drain-to-source voltage drops below a first drain-to-source threshold, and the second trigger comprises a second comparator configured to generate the second control signal if the second drain-to-source voltage drops below a second drain-to-source threshold.

An advantage with this implementation form is that ZVS is achieved when turning on the switches by timing the switch control signal turn-on edges based on the drain-to-source threshold.

In a second possible implementation form of a power converter according to the first implementation form of the fourth aspect, the first trigger further comprises a first resistance circuit coupled between the first switch and the first comparator and being configured to reduce the first drain-to-source voltage to the first comparator, and the second trigger comprises a second resistance circuit coupled between the second switch and the second comparator and being configured to reduce the second drain-to-source voltage to the second comparator. In an embodiment of this implementation form, the first resistance circuit is configured to reduce the first drain-to-source voltage to the first comparator input voltage level, and the second resistance circuit is configured to reduce the second drain-to-source voltage to the second comparator input voltage level.

An advantage of this implementation form is that the high voltage level potential at a drain-source side of the first or second switch can be coupled to a low voltage level input at the comparator side.

According to a fifth aspect of the disclosure, the above mentioned and other objectives are achieved with a system comprising a controller and a power converter according to the first and fourth aspect, respectively.

The advantages of the system according to the fifth aspect are the same as those for the corresponding device claims according to the first aspect and the fourth aspect.

Further applications and advantages of the embodiments of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
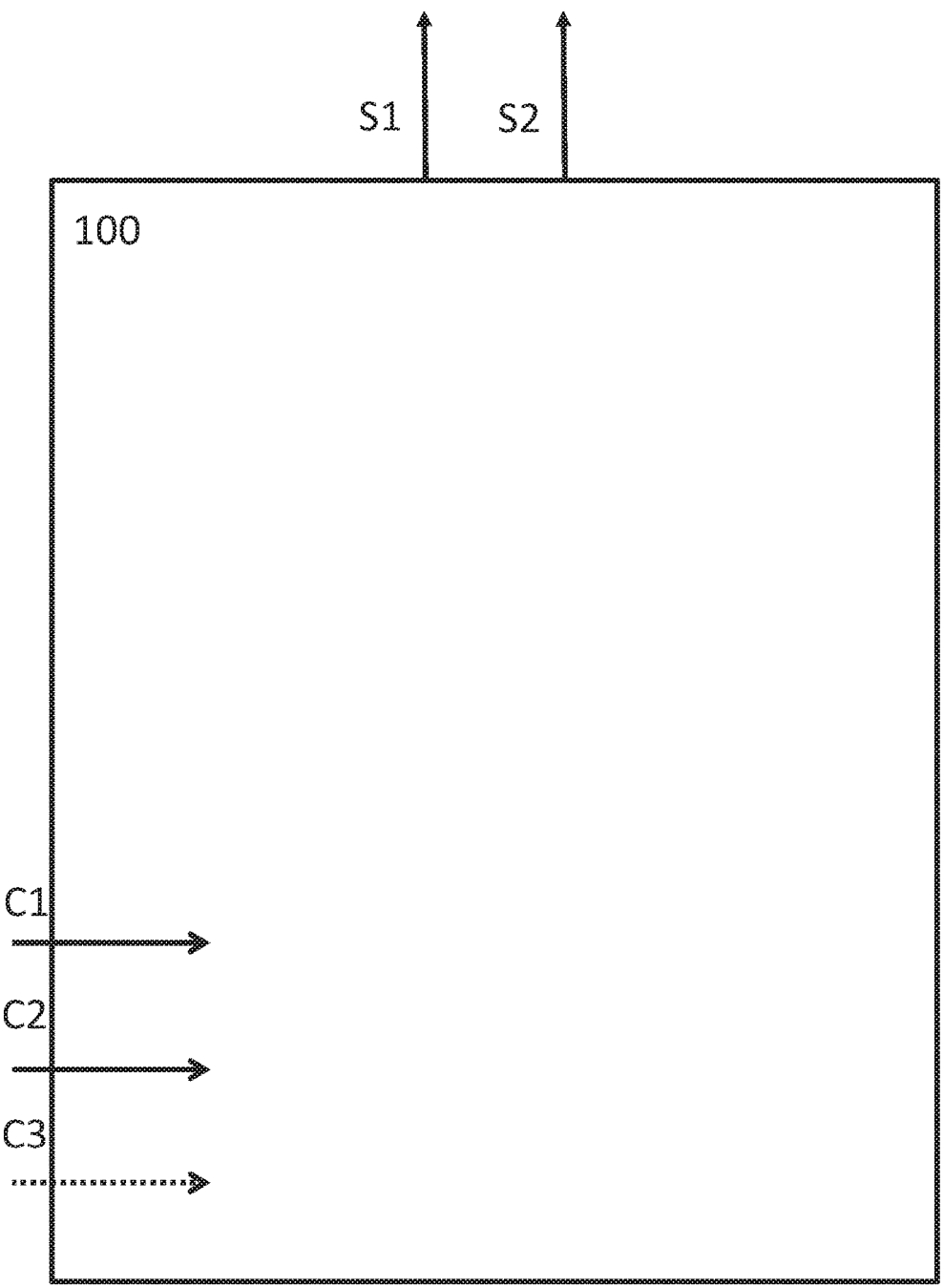
FIG. 1 shows a controller for a power converter, in accordance with one or more embodiments of the disclosure.

FIG. 1 shows a controller 100 for a power converter 300, in accordance with one or more embodiments of the disclosure. The controller 100 may be configured to receive a first control signal C1 based on a first drain-to-source voltage of the first switch, receive a second control signal C2 based on a second drain-to-source voltage of the second switch. The first control signal C1 and the second control signal C2 may be received by respective inputs of the controller 100 in the form of an analogue or digital signal, e.g. indicating a high and a low state. The controller 100 may further be configured to derive a first switch control signal S1 based on the first control signal C1 and control the first switch by providing the first switch control signal S1 to the first switch. The controller 100 may further be configured to derive a second switch control signal S2 based on the second control signal C2 and control the second switch by providing the second switch control signal S2 to the second switch. The first and second switch control signals may be pulse signals, such as Pulse-Width Modulation PWM or Pulse-Duration Modulation PDM signals. The first S1 and second S2 switch control signals may each comprise turn-on edges and turn-off edges, e.g. switch control signals toggling from a low state to a high state or vice versa. The controller 100 may further optionally be configured to receive a third control signal C3 (illustrated with dashed arrow in FIG. 1) based on an inductor current of an inductor of the power converter 300. The third control signal C3 may be received by an input of the controller 100 in a similar manner as for the first control signal C1 and the second control signal C2. The controller 100 may further be configured to derive a first switch control signal S1 further based on the third control signal C3. The controller 100 may further be configured to derive a second switch control signal S2 further based on the third control signal C3.

The switch control signals typically turn-on/turn-off of switches and comprise turn-on edges and turn-off edges. The control signals may be in the form of a PWM signal toggling from a low state to a high state or vice versa. A dead time may appear between boost and freewheeling turn-on edges and turn-off edges. The dead time of the switch control signals may depend mainly on operational conditions, such as capacitor discharge time etc. The dead time of the switch control signals may also be settable by software. The timing of the turn-on edges and turn-off edges may be referred to as switch control signal timing, which if chosen correctly will improve performance. It is understood that ZVS will reduce switching power losses and increase the efficiency of the power converter 300. The boost switch control signal and the freewheeling switch control signal is a complementary pair and the switch control signal will comprise switch control signal timing in the form of at least four switching edges in one switch control signal cycle, e.g. freewheeling switch turn-off edge, boost switch turn-on edge, boost switch turn-off edge and freewheeling switch turn-on edge.

Figure 2:
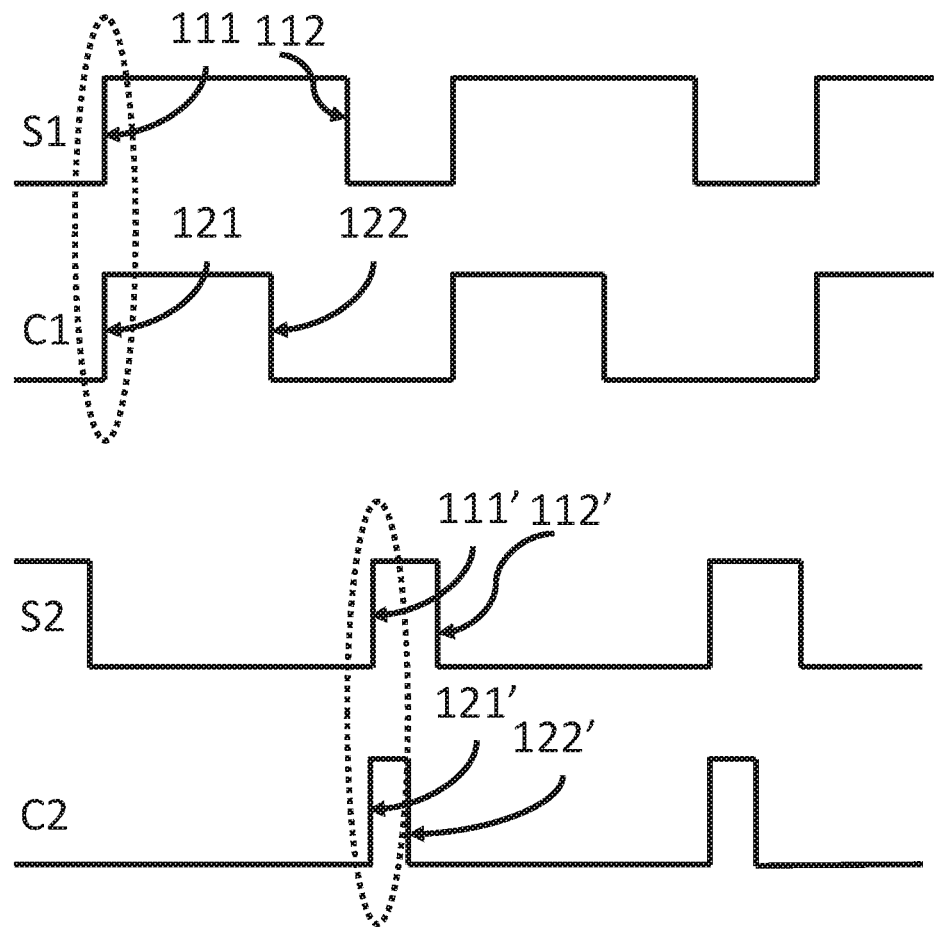
FIG. 2 shows how a controller derives switch control signals based on control signals, in accordance with one or more embodiments of the disclosure.

FIG. 2 shows how a controller 100 derives switch control signals based on control signals, in accordance with one or more embodiments of the disclosure. The controller 100 may further be configured to derive the turn-on edges 111 of the first switch control signal S1 based on trigger-on edges 121 of the first control signal C1, and derive the turn-on edges 111' of the second switch control signal S2 based on trigger-on edges 121' of the second control signal C2. In one example, trigger-on edges are defined by the first or second control signals changing from a low state to a high state, e.g. from 0 to 5 Volts. In yet an example, trigger-off edges are defined by the first C1 or second C2 control signals changing from a high state to a low state, e.g. from 5 to 0 Volts. In a further example turn-on edges of the first or second switch control signal are defined by the first or second switch control signal changing from a low state to a high state, e.g. from 0 to 5 Volts. In a further example turn-off edges of the first or second switch control signal are defined by the first or second switch control signal changing from a high state to a low state, e.g. from 5 to 0 Volts. The controller 100 may further be configured to derive the turn-on edges 111, 111' with no delay in relation to the trigger-on edges 121, 121'.

Figure 3:
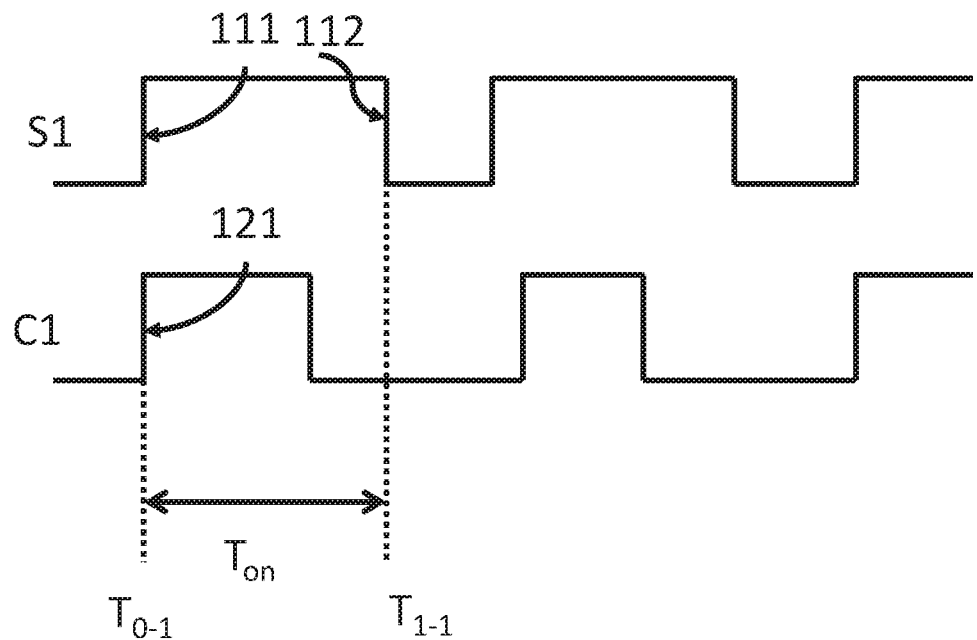
FIG. 3 shows how a controller derives turn-off edges of the switch control signal of the boost switch based on a trigger-on edge of the control signals and the predetermined turn-on-time, in accordance with one or more embodiments of the disclosure.
Figure 3:
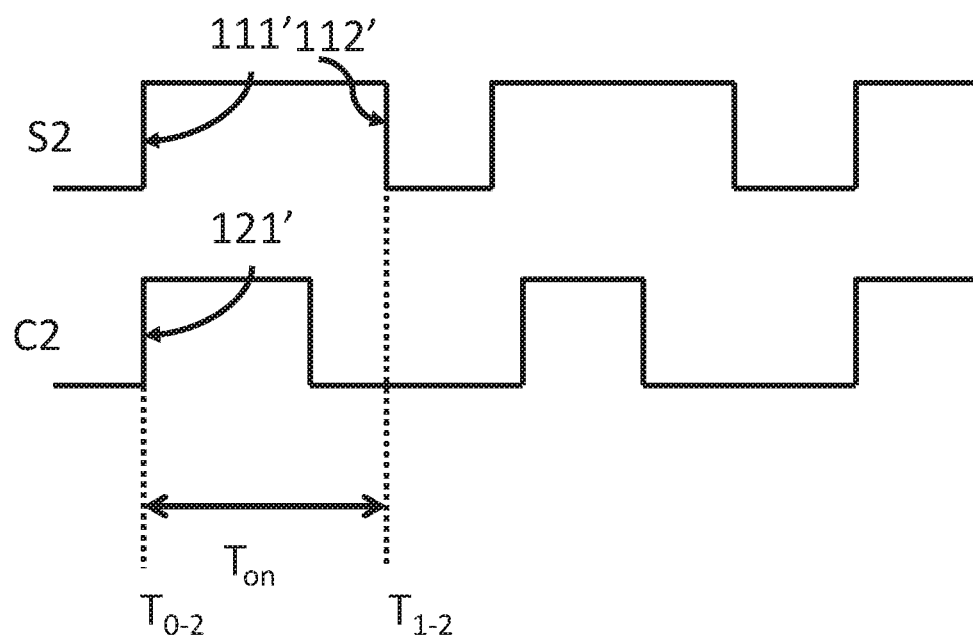

FIG. 3 shows how a controller 100 derives turn-off edges of the switch control signal of the boost switch based on a trigger-on edge of the control signals and the predetermined turn-on-time $T_{on}$, in accordance with one or more embodiments of the disclosure. The controller 100 may further be configured to derive at least one turn-off edge 112 of the first switch control signal S1 based on a trigger-on edge 121 of the first control signal C1 and the predetermined turn-on-time $T_{on}$ when the first switch 181 is configured to act as the boost switch. The controller 100 may further be configured to derive at least one turn-off edge 112' of the second switch control signal S2 based on a trigger-on edge 121' of the second control signal C2 and the predetermined turn-on-time $T_{on}$ when the second switch 182 is configured to act as the boost switch. In an example, the time $T_{1-1}$ when the first switch acting as a boost switch is turned-off is calculated as $T_{1-1}=T_{0-1}+T_{on}$. In yet an example, the time $T_{1-2}$ when the second switch acting as a boost switch is turned-off is calculated as $T_{2-1}=T_{0-2}+T_{on}$.

Figure 4:
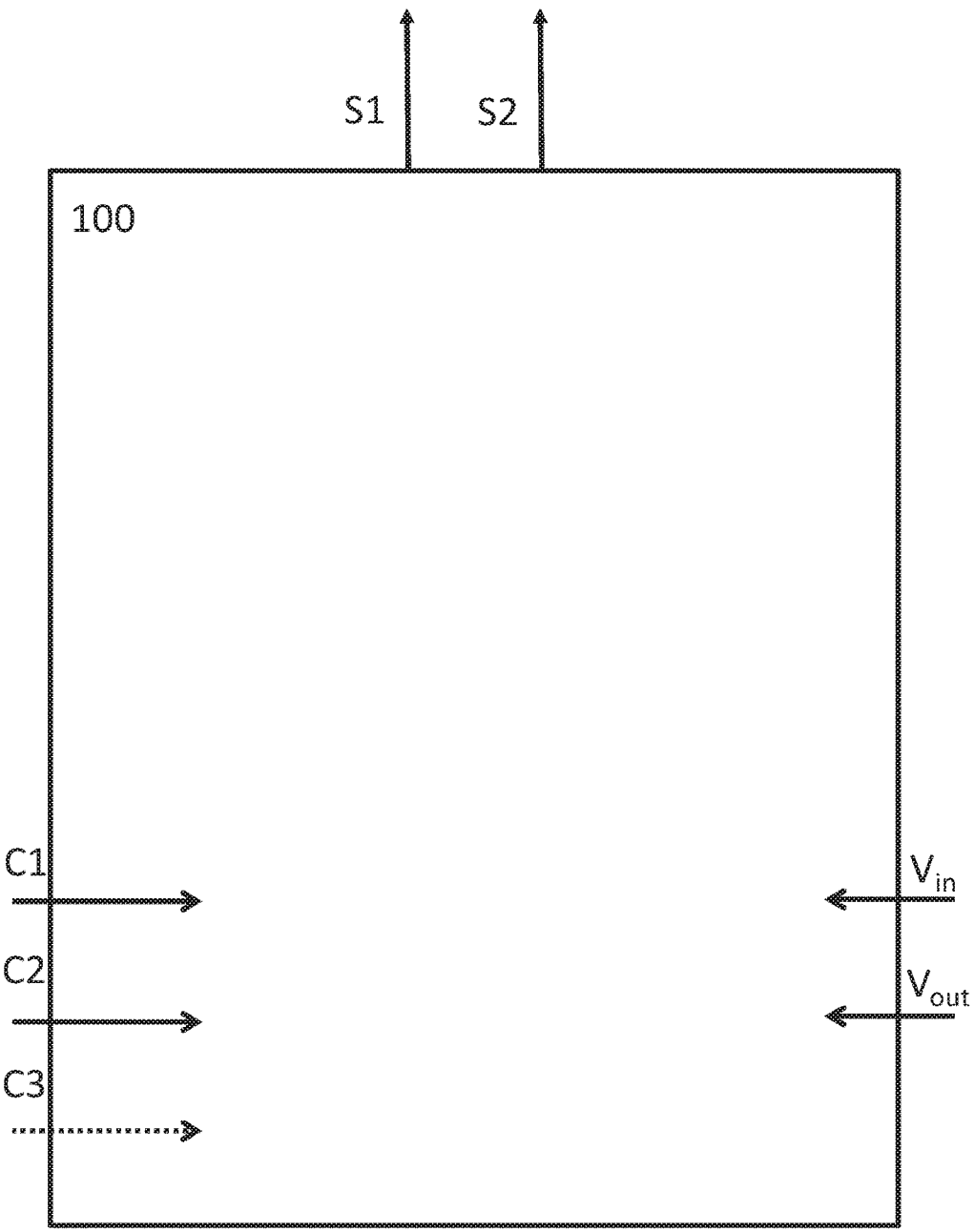
FIG. 4 shows a controller configured to derive switch control signals based on control signals, in accordance with one or more embodiments of the disclosure.

FIG. 4 shows a controller 100 configured to derive switch control signals based on control signals, in accordance with one or more embodiments of the disclosure. The controller 100 may further be configured to derive an additional first control signal and an additional second control signal based on an input voltage $V_{in}$ and the output voltage $V_{out}$ of the power converter 300. The controller 100 may use the input voltage and output voltage to calculate switch control signal timing online based on a predetermined relation such as a mathematical equation or formula, e.g. based on the mathematical equation or formula defined as $T_{off}=T_{on}*V_{in}/(V_{out}-V_{in})$. As explained above, the boost switch and the freewheeling switch is configured as a complementary pair, where the freewheeling switch may be turned-off at least during the time $T_{on}$ when the boost switch is turned-on and may be turned-on during the time $T_{off}$ when the boost switch is turned-off. The switch control signal timing for the boost switch may comprise a constant turn on time $T_{on}$, i.e. the time in a cycle when the boost switch is active, and a varied/adapted turn off time $T_{off}$ for the boost switch, i.e. the time in a cycle when the boost switch is turned-off. The switch control signal timing for turning-on the boost switch may be derived in the same manner as described in relation to FIG. 2 and the switch control signal timing for turning-off the boost switch may be derived as described in relation to FIG. 3. The controller 100 may further be configured to derive trigger-on edges of the first additional first control signal based on trigger-on edges of the first control signal C1, and/or derive trigger-on edges of the second additional first control signal based on trigger-on edges of the second control signal C2. The trigger-on edges of the additional first control signal may be derived to be simultaneous or substantially simultaneous to the trigger-on edges of the first control signal C1. The trigger-on edges of the additional second control signal may be derived to be simultaneous or substantially simultaneous to the trigger-on edges of the second control signal C2. Thus, the timing of $T_{on}$, i.e. the boost switch turn-on edge and/or turn-off edge, may be the same for the control signals as for the additional control signals. As the boost switch and the freewheeling switch are a complementary pair, the freewheeling switch may be turned-on when the boost switch is turned-off. Optionally, the switch control signal timing for turning-on the freewheeling switch may be derived as the switch control signal timing for turning-off the boost switch and an added dead time. The controller 100 may further be configured to derive the first switch control signal based on the first control signal C1 or the additional first control signal, and derive the second switch control signal S2 based on the second control signal C2 or the additional second control signal. The controller 100 may further optionally be configured to receive a third control signal C3 based on based on an inductor current of an inductor of the power converter 300. The third control signal C3 may be received by an inputs of the controller 100 in a similar manner as for the first control signal C1 and the second control signal C2.

Figure 5A:
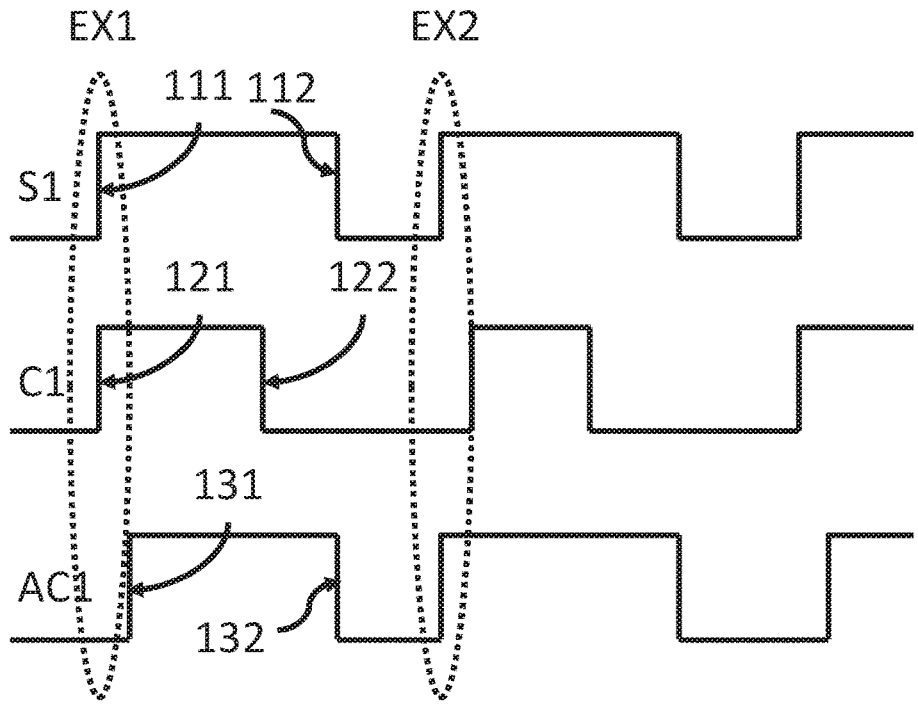
FIG. 5a shows how a controller 100 derives turn-on edges of switch control signals based on trigger-on edges of control signals or additional control signals, in accordance with one or more embodiments of the disclosure.

FIG. 5a shows how a controller 100 derives turn-on edges of switch control signals based on trigger-on edges of control signals or additional control signals, in accordance with one or more embodiments of the disclosure. The controller 100 may further be configured to derive at least one turn-on edge 111 of the first switch control signal S1 based on the first in time of the trigger-on edge 121 of the first control signal C1 or the trigger-on edge 131 of the additional first control signal AC1. In FIG. 5a, a first example EX1 shows how the controller 100 derives at least one turn-on edge 111. The trigger-on edge 121 of the first control signal C1 arrives first in time relative to the trigger-on edge 131 of the additional first control signal AC1 and the turn-on edge 111 of the first switch control signal S1 is derived to be simultaneous to the trigger-on edge 121 of the first control signal C1. Further in FIG. 5a, a second example EX2 shows how a trigger-on edge of the additional first control signal AC1 is used to derive a second turn-on edge.

Figure 5B:
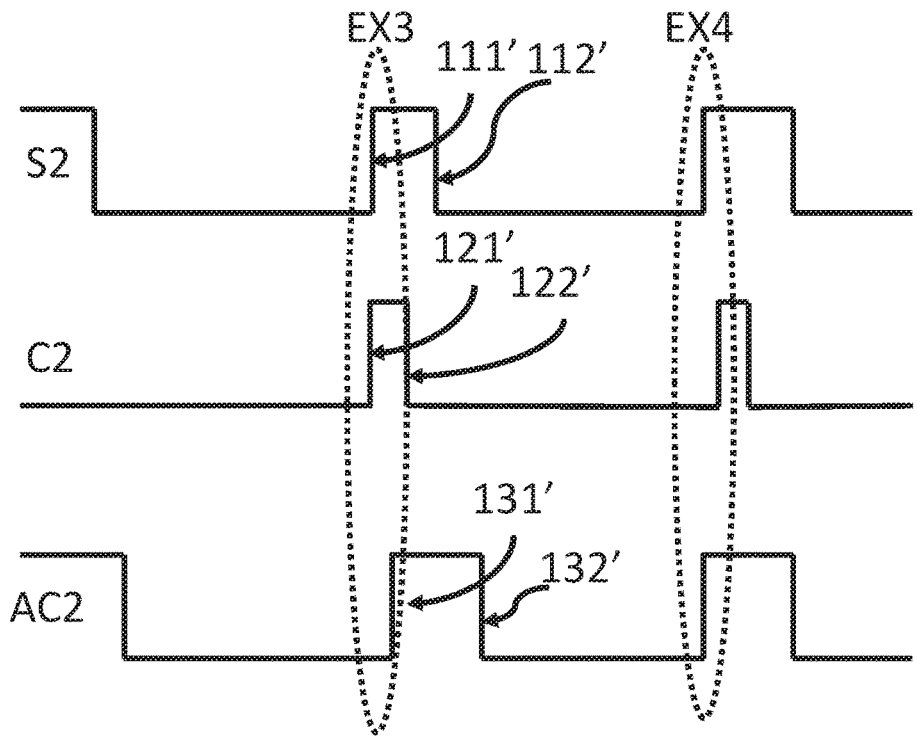
FIG. 5b shows how a controller 100 derives turn-on edges of switch control signals based on trigger-on edges of control signals or additional control signals, in accordance with one or more embodiments of the disclosure.

FIG. 5b shows how a controller 100 derives turn-on edges of switch control signals based on trigger-on edges of control signals or additional control signals, in accordance with one or more embodiments of the disclosure. The controller 100 may further be configured to derive at least one turn-on edge 111' of the second switch control signal S2 based on the first in time of the trigger-on edge 121' of the second control signal C2 or the trigger-on edge 131' of the additional second control signal AC2. In FIG. 5b, a third example EX3 shows how the controller 100 derives at least one turn-on edge 111'. The trigger-on edge 121' of the second control signal C2 arrives first in time relative to the trigger-on edge 131' of the additional second control signal AC2 and the turn-on edge 111' of the second switch control signal S2 is derived to be simultaneous to the trigger-on edge 121' of the second control signal C2. Further in FIG. 5b, a fourth example EX4 is shown, where a trigger-on edge of the additional second control signal AC2 arrives first in time relative to the trigger-on edge of second control signal C2 and the turn-on edge of the second switch control signal S2 is derived to be simultaneous to the trigger-on edge of the additional second control signal AC2.

Figure 6A:
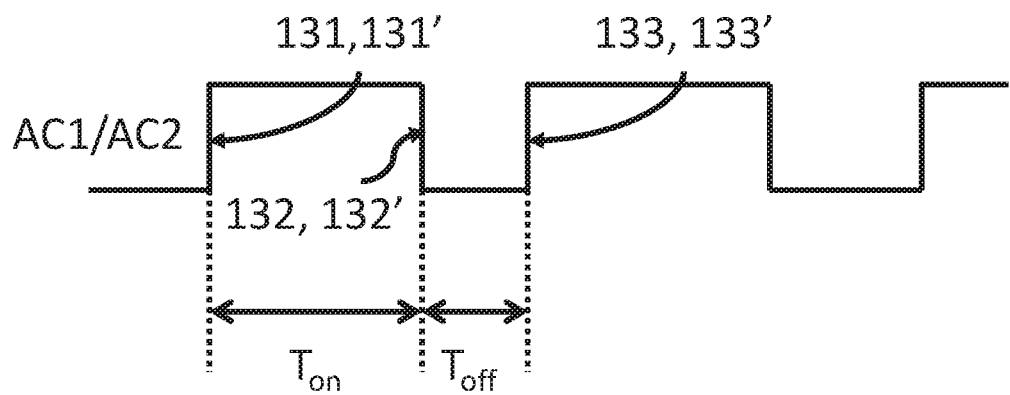
FIG. 6a shows how a controller derives turn-on edges of the additional control signals based on a turn-off-time, in accordance with one or more embodiments of the disclosure.

FIG. 6a shows how a controller 100 derives turn-on edges of the additional control signals based on a turn-off-time, in accordance with one or more embodiments of the disclosure. In an example shown in FIG. 6a, the additional control signals, i.e. AC1 or AC2, have trigger-on edges 131, 131' and trigger-off edges 132, 132' derived by the controller 100 based on the turn on time $T_{on}$, as further described in relation to FIGS. 1 to 5. The additional control signals, AC1, AC2, act as a backup for controlling the boost switch. In one embodiment, the trigger-on edges 133, 133' of the next cycle are derived after the turn-off-time $T_{off}$.

Figure 6B:
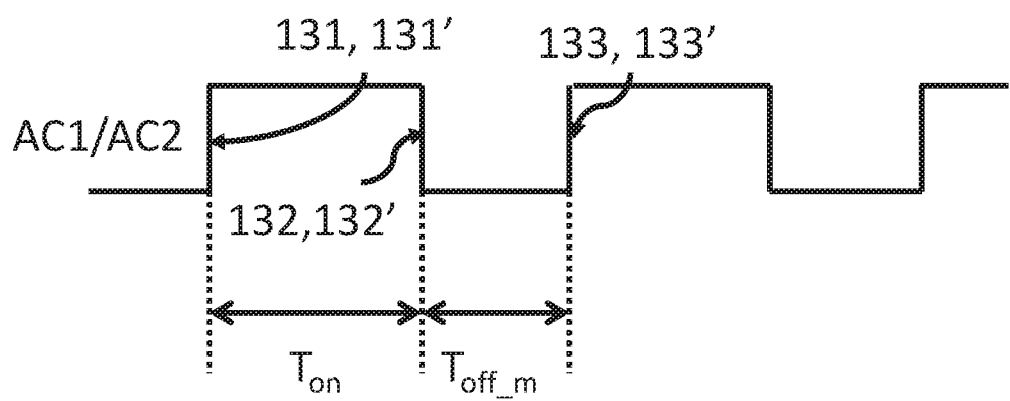
FIG. 6b shows how a controller derives turn-on edges of the additional control signals based on a turn-off-time delay, in accordance with one or more embodiments of the disclosure.

FIG. 6b shows how a controller 100 derives turn-on edges of the additional control signals based on a turn-off-time delay, in accordance with one or more embodiments of the disclosure. The controller 100 may further be configured to derive the turn-on edges of the additional first control signal AC1 and the turn-on edges of the additional second control signal AC2 based on a turn-off-time delay $T_{off\_m}$. The turn-off-time delay $T_{off\_m}$ may be determined according to the formula $$T_{off\_m}=T_{off}*\mu, \mu>1,$$

The controller 100 may further be configured to determine the turn-off-time delay $T_{off\_m}$ based on a predetermined turn-on-time $T_{on}$ and/or a predetermined turn-off-time $T_{off}$ where the predetermined turn-off-time $T_{off}$ is determined according to the formula $$T_{off} = T_{on} * \frac{V_{in}}{(V_{out} - V_{in})}.$$

In yet an example shown in FIG. 6b, the additional first and second control signals AC1, AC2 are intended to be a backup and the first and the second control signals C1, C2 are intended as the main or preferred option as they will result in near optimal power converter control. If the triggers of the power converter 300 generating the first and second control signals C1, C2 were to fail, the power converter 300 would not function properly. The first and second control signals AC1, AC2 will then act as backup signals, thereby ensuring the function of the power converter 300. The first and second control signals AC1, AC2 are calculated/estimated switch control signal timing, and will not have the same accuracy and not result in the same performance of the power converter 300. It is therefore desirable to avoid that they are used when valid first and second control signals C1, C2 are available. This is solved by prolonging or delaying the calculated period $T_{off}$ when the boost switch is turned-off as defined by the first and second control signals AC1, AC2 such that it is always longer than the period the boost switch is turned-off as defined by the first and second control signals C1, C2. As shown in FIG. 6a, the additional control signal, i.e. AC1 or AC2, acting as a backup for controlling the boost switch is derived by the controller 100 and have, within one cycle, a trigger-on edge 131, 131' and a trigger-off edge 132, 132' derived after a turn-off-time delay $T_{off\_m}$, being a prolonged turn-off-time $T_{off}$.

Figure 7:
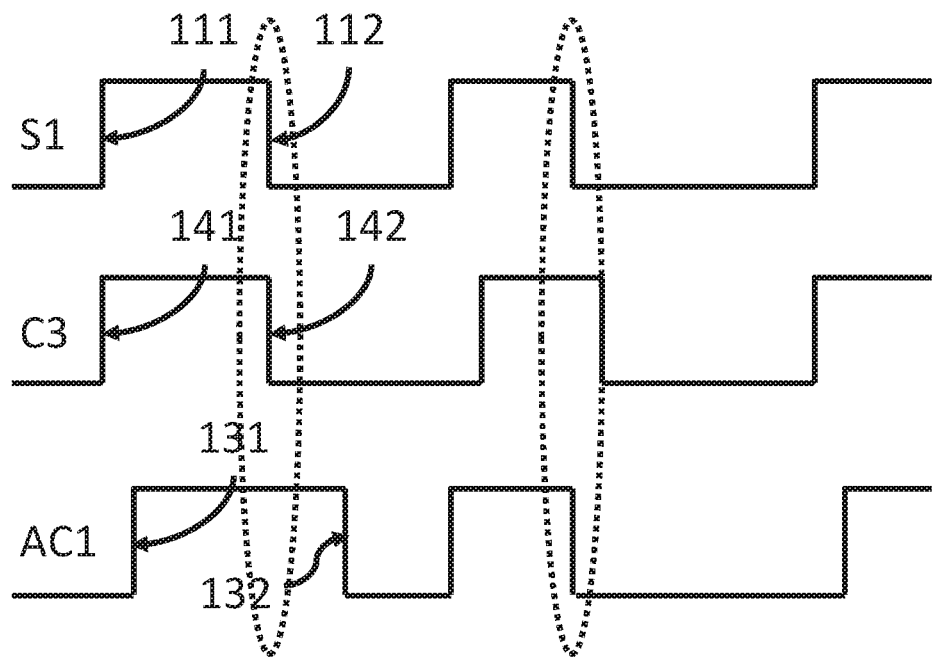
FIG. 7 shows how a controller derives turn-off edges of the switch control signal controlling the freewheeling switch based on the first in time of a trigger-off edge of a third control signal and a trigger-off edge of the additional control signals, in accordance with one or more embodiments of the disclosure.
Figure 7:
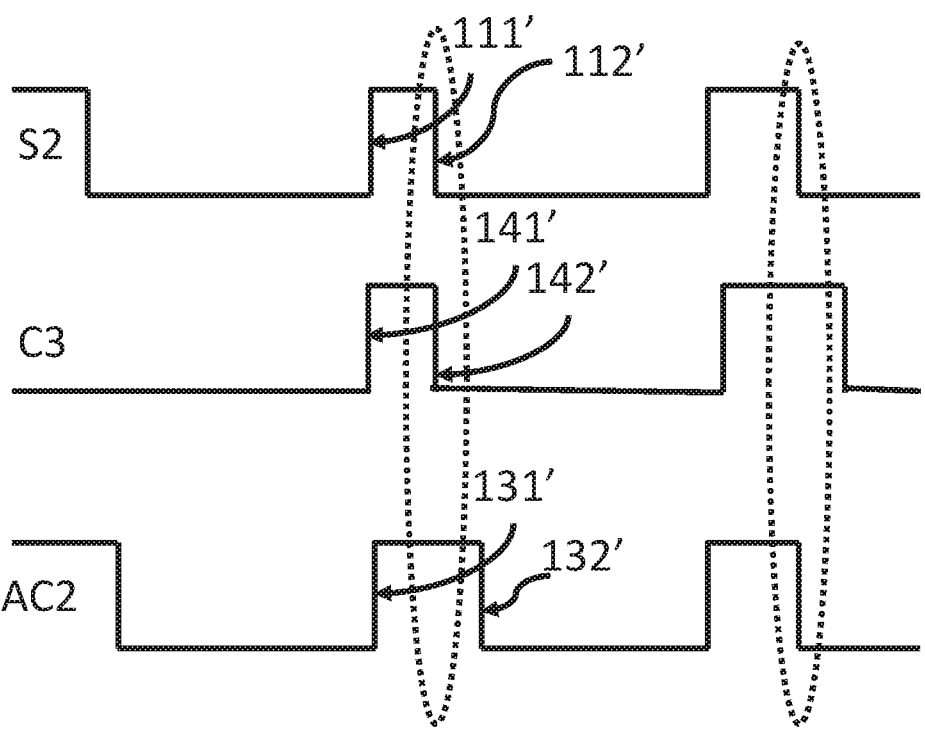

FIG. 7 shows how a controller 100 derives turn-off edges of the switch control signal controlling the freewheeling switch based on the first in time of a trigger-off edge of a third control signal and a trigger-off edge of the additional control signals, in accordance with one or more embodiments of the disclosure. The controller 100 may further be configured to receive a third control signal C3 based on an inductor current of an inductor of the power converter 300. The controller 100 may further be configured to derive at least one turn-off edge 112 of the first switch control signal S1 based on first in time of a trigger-off edge 142 of the third control signal C3 and a trigger-off edge 132 of the additional first control signal AC1 when the first switch is configured to act as the freewheeling switch. The controller 100 may further be configured to derive at least one turn-off edge 112' of the second switch control signal S2 based on first in time of a trigger-off edge 142' of the third control signal C3 and a trigger-off edge 132' of the additional second control signal AC2 when the second switch is configured to act as the freewheeling switch.

In one example, the switch control signals S1, S2 may be derived based on the control signals C1, C2, C3. The boost switch turn-on edge, the freewheeling switch turn-on edge and the freewheeling switch turn-off edge may each be derived based on the output signal of the respective trigger, i.e. the first trigger, the second trigger and the third trigger. The switch control signals S1, S2 may further be derived based on a predetermined turn-on-time $T_{on}$. The boost switch turn-off edge may be derived based on the boost switch turn-on edge and the predetermined turn-on-time $T_{on}$.

In yet an example, the switch control signals S1, S2 may derived based on the additional first control signals. The boost switch turn-on edge, the freewheeling switch turn-on edge and the freewheeling switch turn-off edge may each be derived based on a mathematical equation or formula, e.g. based on the mathematical equation or formula defined as $T_{off} = T_{on} * V_{in}/(V_{out} - V_{in})$. and optionally predetermined dead times. The switch control signals S1, S2 may further be derived based on a predetermined turn-on-time $T_{on}$. The boost switch turn-off edge may be derived based on the boost switch turn-on edge and the predetermined turn-on-time $T_{on}$. I.e., three out of the four edges, such as the boost switch turn-on edge, the freewheeling switch turn-on edge and the freewheeling switch turn-off edge may be derived to occur at different times when they are derived based on the additional first control signals AC1, AC2, compared to when they are derived based on the control signals C1, C2, C3. However, the boost switch turn-on edge will always be derived to occur/arrive at the same time, regardless if it is derived based on the, software driven, additional first control signals AC1, AC2 or derived based on the, hardware driven, control signals C1, C2, C3.

Figure 8:
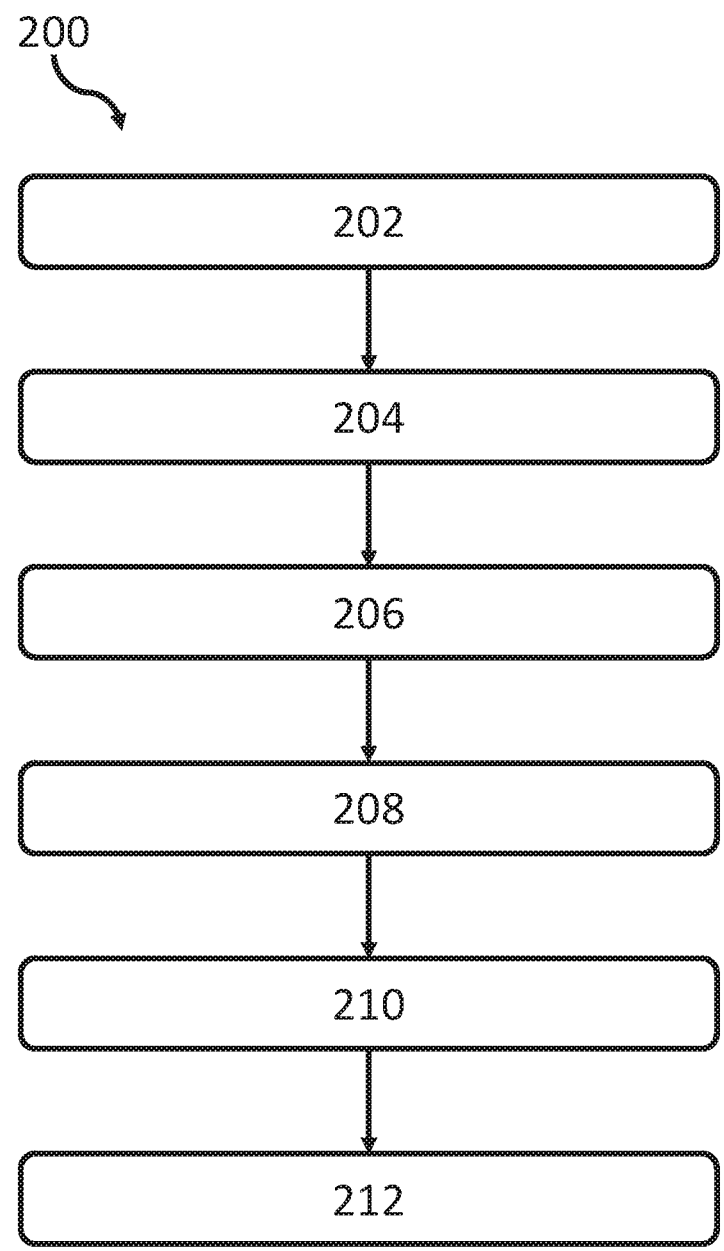
FIG. 8 shows a method at a controller, in accordance with one or more embodiments of the disclosure.

FIG. 8 shows a method at a controller 100, in accordance with one or more embodiments of the disclosure. The method 200 comprising receiving 202 a first control signal C1 based on a first drain-to-source voltage of the first switch 381; receiving 204 a second control signal based on a second drain-to-source voltage of the second switch; deriving 206 a first switch control signal based on the first control signal and controlling 208 the first switch by providing the first switch control signal S1 to the first switch; deriving 210 a second switch control signal based on the second control signal and controlling 212 the second switch by providing the second switch control signal to the second switch.

The power converter 300 typically comprises an energy transfer inductor, such in the case of a boost converter, a buck converter or a boost-buck converter. For a boost converter, the inductor is typically coupled to a boost switch and a freewheeling switch. The boost switch and the freewheeling switch are configured as a complementary pair, where the freewheeling switch is deactivated/turned-off during the time when the boost switch is activated/turned-on and vice versa.

Figure 9:
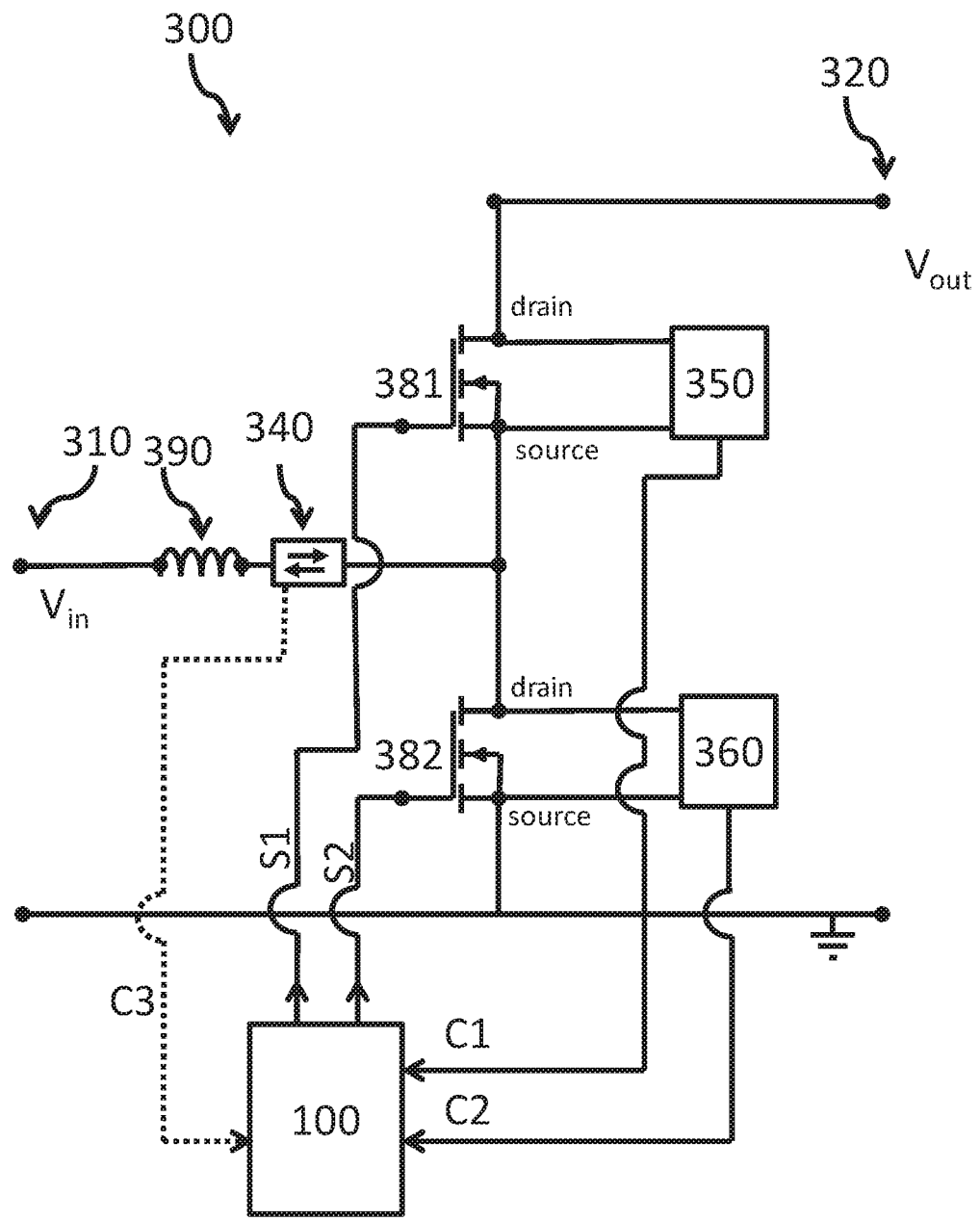
FIG. 9 shows a power converter, in accordance with one or more embodiments of the disclosure.

FIG. 9 shows a power converter 300, in accordance with one or more embodiments of the disclosure. The power converter 300 may comprise an input 310 configured to receive an input voltage $V_{in}$ and an output 320 configured to provide an output voltage $V_{out}$. The power converter 300 may further comprise an inductor 390 coupled to a first switch 381 and a second switch 382, wherein the first switch 381 is configured to act as a freewheeling switch when the second switch 382 is configured to act as a boost switch, or vice versa. The power converter 300 may further comprise a first trigger 350 configured to generate a first control signal C1 based on a first drain-to-source voltage of the first switch 381 and to send the first control signal C1 to a controller 100. The power converter 300 may further comprise a second trigger 360 configured to generate a second control signal C2 based on a second drain-to-source voltage of the second switch 382 and to send the second control signal C2 to the controller 100. In an embodiment of the disclosure, the first switch 381 is further configured to be controlled by a first switch control signal S1 received from the controller 100. In yet an embodiment, the second switch 382 is further configured to be controlled by a second switch control signal S2 received from the controller 130. In optional embodiments, the power converter 300 may further comprise a third trigger 340 configured to generate a third control signal C3 based on an inductor current of the inductor 390. The first trigger 350, the second trigger 360 and the optional third trigger 340 may comprise differential comparators. The first switch 381 and the second switch 382 may be MOSFET switches. The input voltage $V_{in}$ may be an AC or a DC voltage. The output voltage $V_{out}$ may be a DC voltage.

Figure 10:
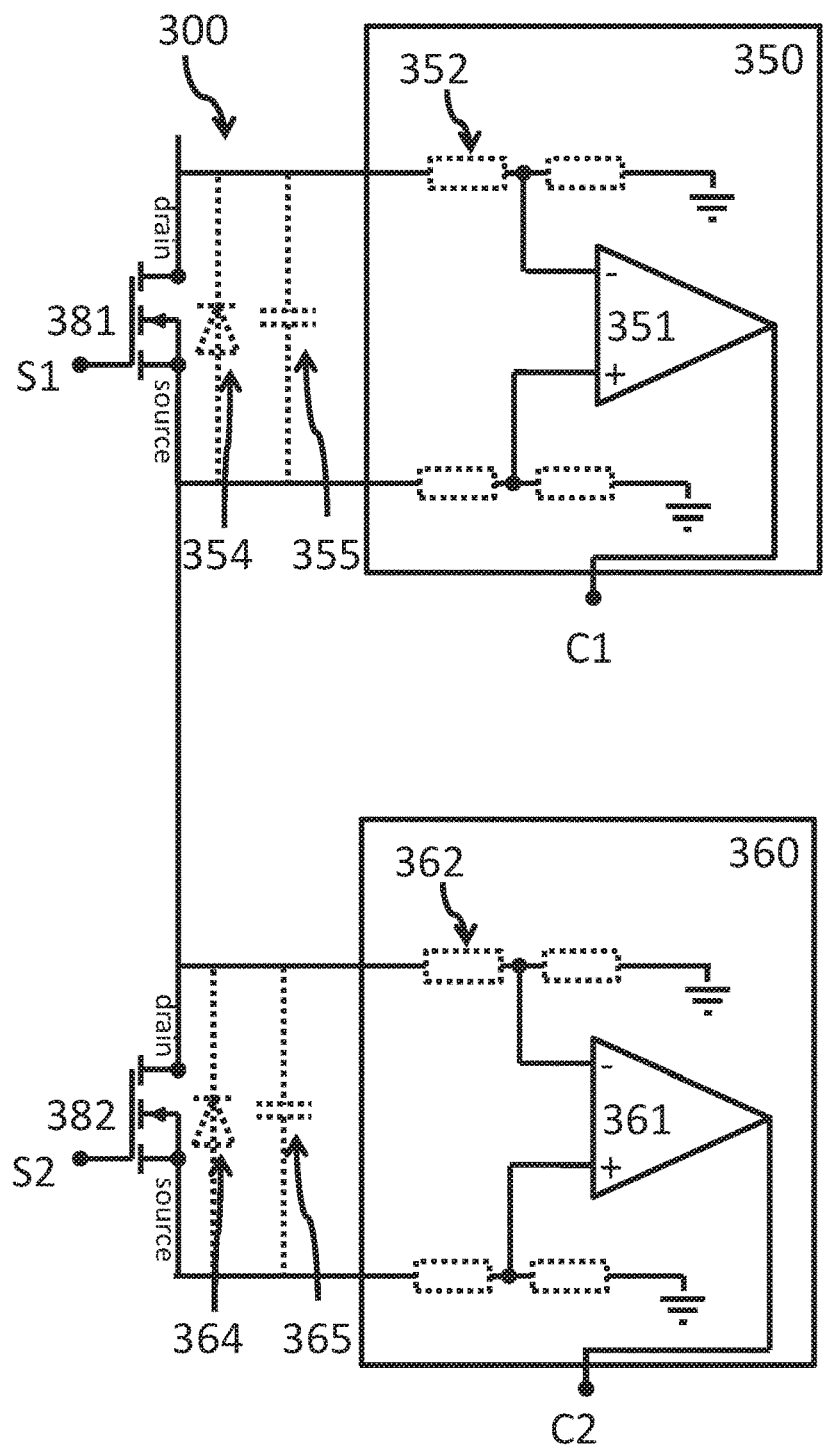
FIG. 10 shows details of a power converter, in accordance with one or more embodiments of the disclosure.

FIG. 10 shows details of a power converter 300, in accordance with one or more embodiments of the disclosure. The first trigger 350 comprises a first comparator 351 configured to generate the first control signal C1 if the first drain-to-source voltage drops below a first drain-to-source threshold. The second trigger 360 comprises a second comparator 361 configured to generate the second control signal C2 if the second drain-to-source voltage drops below a second drain-to-source threshold. The first comparator 351 and the second comparator 361 are be differential comparators in this particular embodiment.

In yet an embodiment, the first trigger 350 further comprises a first resistance circuit 352 coupled between the first switch 381 and the first comparator 351 and being configured to reduce the first drain-to-source voltage to the first comparator 351. In yet an embodiment, the second trigger 360 further comprises a second resistance circuit 362 coupled between the second switch 382 and the second comparator 362 and being configured to reduce the second drain-to-source voltage to the second comparator 362.

In yet an embodiment, the first switch 381 further comprises a first capacitor 355 coupled between the drain and source ports of the first switch 381 and a first diode 354 coupled in the forward direction from the source port to the drain port of the first switch 381. The second switch 382 further comprises a second capacitor 365 coupled between the drain and source ports of the second switch 382 and a second diode 364 coupled in the forward direction from the source port to the drain port of the second switch 382.

In an example, the drain-to-source voltages of the first and second 381,382, switches are sensed/measured by the first and second trigger 350, 360, respectively. The inductor current is measured by the third trigger (not shown). The trigger output signals C1, C2 toggles when the respective capacitor 355, 365, voltage is discharged to a certain level. The toggled output signal of the first or second trigger indicates that the boost or freewheeling switch is within a desired ZVS region and is therefore ready to turn on. Depending on the polarity of the input voltage, the first switch 381 will act as the freewheeling switch and the second switch will act as the boost switch, or vice versa. The output signal of the third trigger toggles when the inductor current exceeds a pre-defined current threshold value $\pm i_T$, the toggled output indicates that the first or second switch acting as the freewheeling switch is ready to turn off. All the trigger output signals C1, C2, C3 are sent to the controller 100, where switch control signals S1, S2, for the boost and freewheeling switches are generated. As the trigger output signals C1, C2, C3 are created by hardware, they may be referred to as hardware driven control signals. As further described in relation to FIG. 4, the additional first control signal AC1 and the additional second control signal AC2 are also derived, which may be referred to as software driven control signals. As no trigger is needed to generate the software driven control signals, they may be seen as being independent from the hardware driven control signals. In the majority of cases, hardware driven control signals are the active control signals used by the controller 100 to derive switch control signals S1, S2, because they yield optimum control performance. The software control signals play a role as an alternative or backup; they preferably are used when hardware driven control signals malfunction or function undesirably, e.g. due to failure in associated hardware circuits.

In yet an example, the drain port of the first switch 381 is connected to the invert input side − of the first comparator 351 and the source port is connected to the non-invert input side + of the first comparator 351, as depicted in FIG. 10. Likewise, the drain port of the second switch 382 is connected to the invert input side − of the first comparator 361 and the source port is connected to the non-invert input side + of the first comparator 361, also depicted in FIG. 10. The inductor current may be measured in both current directions by the third trigger 340. The third trigger 340 may comprise a conventional current sensing circuit connected to a non-invert input side + of a comparator and a reference signal representing the inductor current threshold level $\pm i_T$ is connected to the invert input side of the comparator.

In an example, the second switch 382 is acting as a boost switch and the first switch 381 is acting as a freewheeling switch. In a part of the cycle, the second switch 382 is active and the inductor current is flowing from the inductor to the switches. As the voltage over the inductor is the same as the positive input voltage $V_{in}$, the inductor is being charged and the inductor current is rising up or increasing. After the second switch 382 has been active for the turn on time $T_{on}$, the second switch 382 acting as a boost switch is turned-off at a first point in time $T_{1-2}$, as further described in relation to FIG. 3. The inductor current will then commutate to the first diode 354 and continue to flow in the same direction. The voltage over the inductor is then equal to the difference between the output voltage and the input voltage, i.e. $V_{out} - V_{in}$. Because $V_{out}$ is now greater than $V_{in}$, the voltage over the inductor will change polarity and the inductor current start to fall. Before the first switch 381 turns off, its drain-source voltage will be close to or to the output voltage $V_{out}$ and the inductor current starts to discharge the first capacitor 355. As soon as the drain-to-source voltage over the first capacitor 355 becomes negative, the output signal C1 of the first trigger 350 is toggled. The toggled output signal C1 is routed to the controller 100, where a turn-on edge of the switch control signal S1 is generated to turn-on the first switch 381 acting as the freewheeling switch. As soon as the first switch 381 is turned-on, the inductor current immediately flows through the first switch 381. When the first switch 381 is turned-on, the inductor current will continue to decrease and can decrease below zero, i.e. flowing from the switches to the inductor. When the inductor current flows flowing from the switches to the inductor and further exceeds the negative current threshold $-i_T$, the third triggers output signal C3 toggles. The toggled output signal causes the controller 100 to derive a turn-off edge in the switch control signal S1 and turn off the first switch 381 acting as the freewheeling switch. As soon as the turn off edge in the first switch control signal S1 arrives, the cycle of deriving the software driven control signals, i.e. the additional first control signal AC1 and the additional second control signal AC2, is reset at the same time as the cycle of deriving the hardware driven control signals, i.e. the first control signal C1 and the second control signal C2, is re-started.

Figure 11:
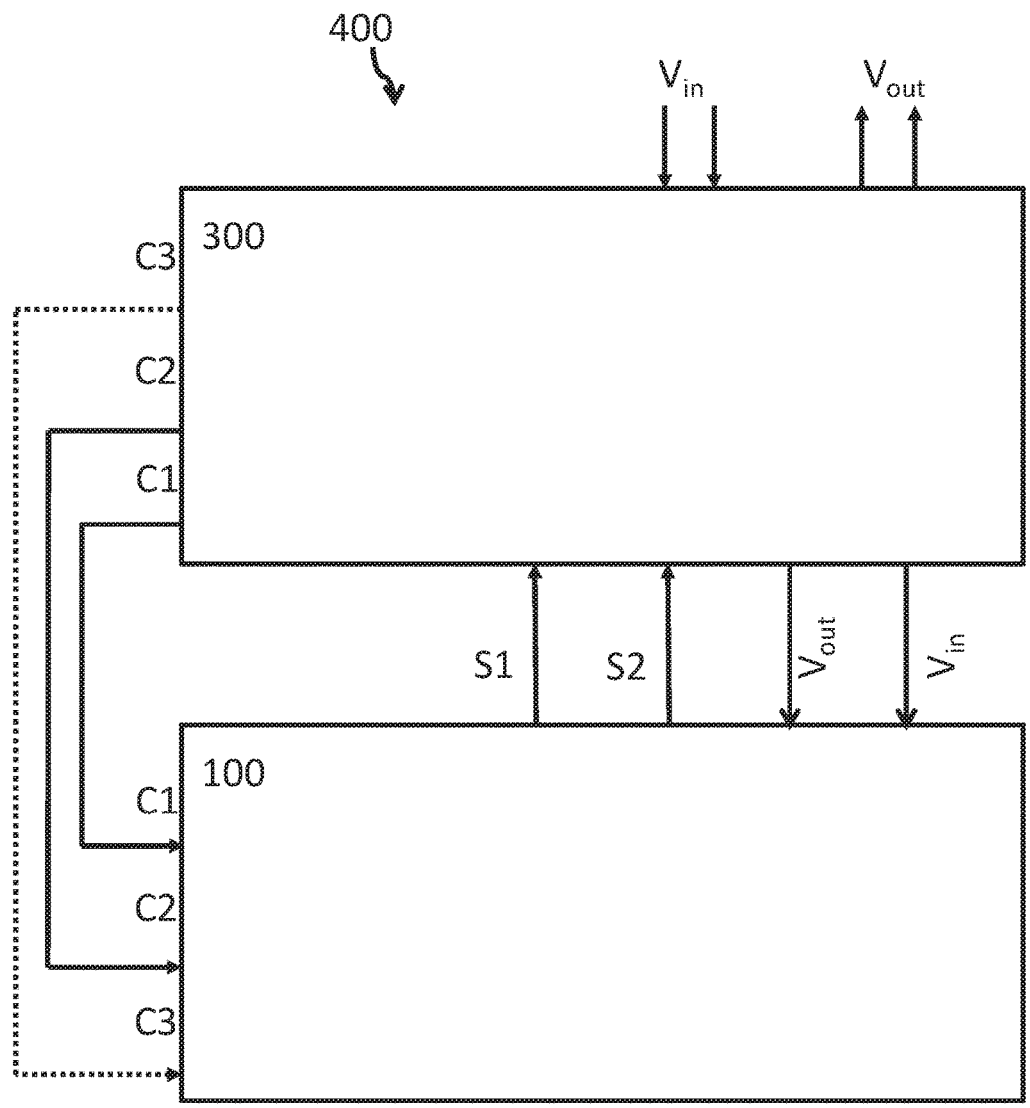
FIG. 11 shows a system, in accordance with one or more embodiments of the disclosure.

FIG. 11 shows a system 400, in accordance with one or more embodiments of the disclosure. The system 400 comprises a controller 100 and a power converter 300 according to embodiments of the disclosure. The controller 100 may be configured to send the first switch control signal S1 and to send the second switch control signal S2 to control the power converter 300. The power converter 300 may be configured to send the first control signal C1 to the controller 100, to send the second control signal C2 to the controller 100. The power converter 300 may be further configured to receive an input voltage $V_{in}$ and to provide an output voltage $V_{out}$. In an embodiment, the power converter 300 may be further configured to provide the input voltage $V_{in}$ and to provide the output voltage $V_{out}$ to the controller 100. In an embodiment, the power converter 300 may be further configured to send the third control signal C3 to the controller 100.

Figure 12:
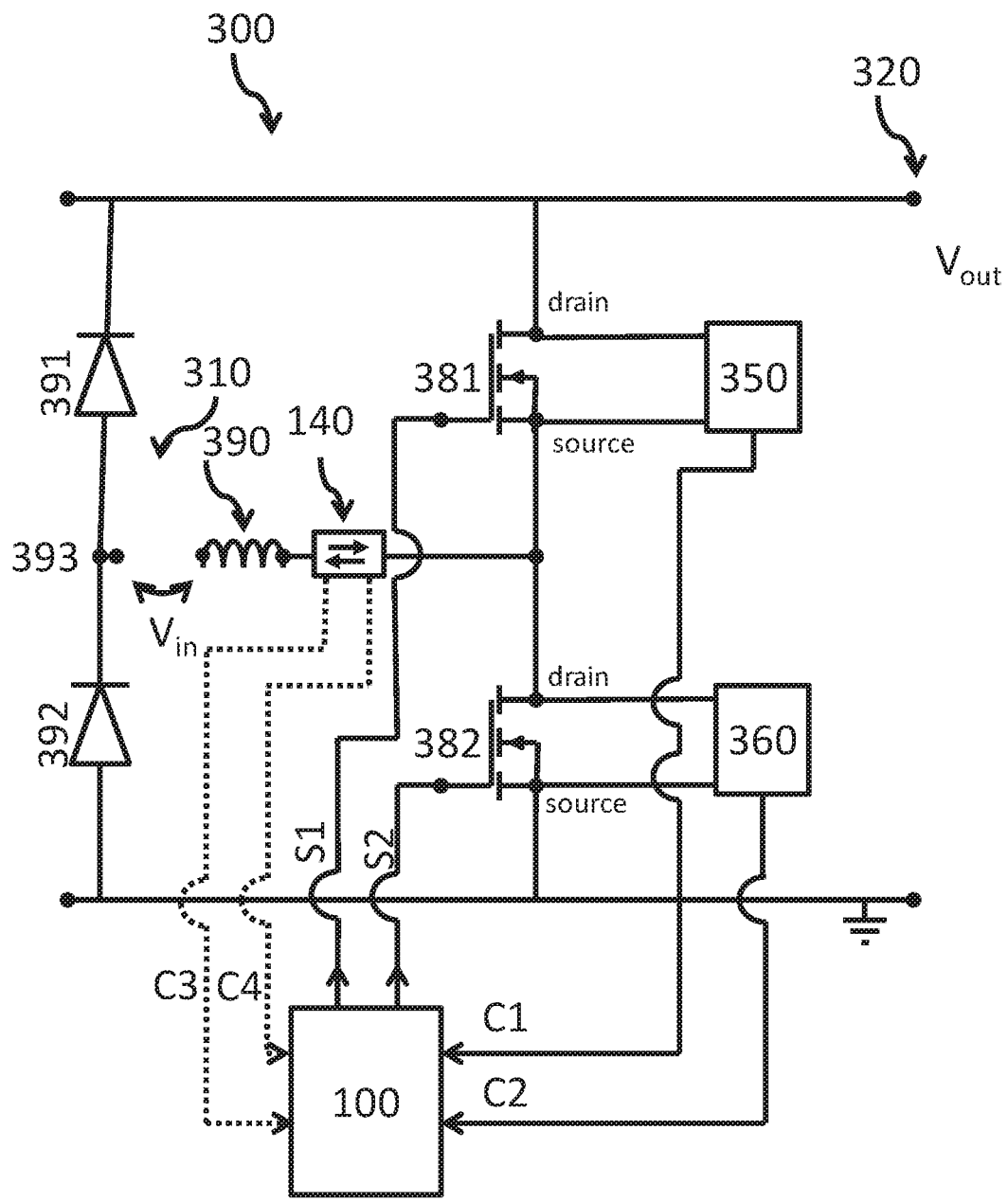
FIG. 12 shows a power converter for converting AC to DC, in accordance with one or more embodiments of the disclosure.

FIG. 12 shows a power converter 300 for converting AC to DC, in accordance with one or more embodiments of the disclosure. The power converter 300 comprises all the components as described in relation to FIG. 9. The power converter 300 further comprises a second bridge diode 392 coupled in its forward direction from the source port of the second switch 382 to a bridge port 393. The power converter 300 further comprises a first bridge diode 391 coupled in its forward direction from the bridge port 393 to the drain port of the first switch 381. The input voltage $V_{in}$ may be an AC voltage and is coupled to the inductor, in a similar manner as in FIG. 9, and to the bridge port 393. When the input voltage $V_{in}$ is in its positive phase, i.e. having a higher electrical potential on the inductor side than on the bridge port 393 side, the first switch 381 will act as the freewheeling switch and the second switch 382 will act as the boost switch. When the input voltage $V_{in}$ is in its negative phase, i.e. having a lower electric potential on the inductor side than on the bridge port 393 side, the first switch 381 will act as the boost switch and the second switch 382 will act as the freewheeling switch.

Figure 13:
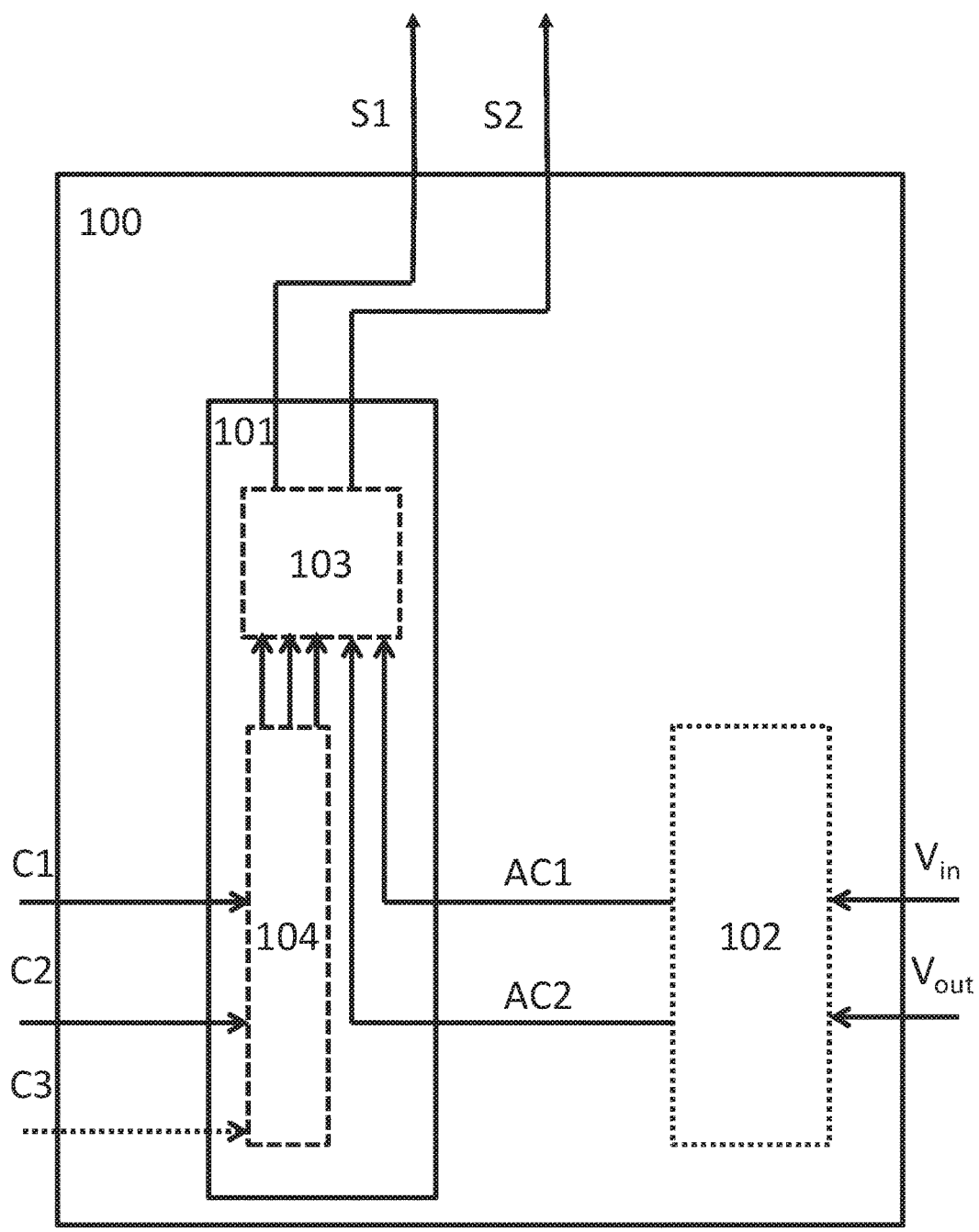
FIG. 13 shows a controller comprising at least one processor, in accordance with one or more embodiments of the disclosure.

FIG. 13 shows a controller 100 comprising at least one processor, in accordance with one or more embodiments of the disclosure. The controller 100 may comprise a first processor 101 configured to receive a first control signal C1 based on a first drain-to-source voltage of the first switch. The controller 100 may further be configured to receive a second control signal C2 based on a second drain-to-source voltage of the second switch. The controller 100 may further be configured to derive a first switch control signal S1 based on the first control signal C1 and control the first switch by providing the first switch control signal S1 to the first switch. The controller 100 may further be configured to derive a second switch control signal S2 based on the second control signal C2 and control the second switch by providing the second switch control signal S2 to the second switch. The first switch control signal S1 and the second switch control signal S2 may each comprise turn-on edges and turn-off edges.

In an embodiment, the first processor 101 may further be configured to derive the turn-on edges of the first switch control signal S1 based on trigger-on edges of the first control signal C1, and derive the turn-on edges of the second switch control signal S2 based on trigger-on edges of the second control signal C2.

In yet an embodiment, the controller 100 further comprises a second processor 102 configured to derive an additional first control signal AC1 and an additional second control signal AC2 based on an input voltage $V_{in}$ and the output voltage $V_{out}$ of the power converter 300, derive at least one turn-on edge of the first switch control signal S1 based on the first in time of the trigger-on edge of the first control signal C1 or the trigger-on edge of the additional first control signal AC1, and derive at least one turn-on edge of the second switch control signal S2 based on the first in time of the trigger-on edge of the second control signal C2 or the trigger-on edge of the additional second control signal AC2.

In yet an embodiment, the first processor further comprises a switch control signal generator module 104 and an arbitrator module 103, wherein the switch control signal generator module 104 of the first processor 101 is configured to receive a first control signal C1 based on a first drain-to-source voltage of the first switch 381; receive a second control signal C2 based on a second drain-to-source voltage of the second switch; wherein the arbitrator module 103 is configured to derive a first switch control signal S1 based on the first control signal C1 and the additional first control signal AC1 and control the first switch by providing the first switch control signal S1 to the first switch; derive a second switch control signal S2 based on the second control signal C2 and the additional second control signal AC2 and control the second switch 382 by providing the second switch control signal S2 to the second switch; wherein the first switch control signal S1 and the second switch control signal S2 each comprises turn-on edges and turn-off edges.

In yet an embodiment, the first processor 101 may further be configured to derive an additional first control signal AC1 and an additional second control signal AC2 based on an input voltage $V_{in}$ and the output voltage $V_{out}$ of the power converter 300, derive at least one turn-on edge 111 of the first switch control signal S1 based on the first in time of the trigger-on edge 121 of the first control signal C1 or the trigger-on edge 131 of the additional first control signal AC1, and derive at least one turn-on edge of the second switch control signal S2 based on the first in time of the trigger-on edge of the second control signal C2 or the trigger-on edge of the additional second control signal AC2.

Furthermore, any method according to the embodiments of the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Especially, the processors of the present devices may comprise, e.g., one or more instances of a Central Processing Unit (CPU), a processing unit, a processing circuit, a processor, an Application Specific Integrated Circuit (ASIC), a microprocessor, a Field-Programmable Gate Array (FPGA), Complex Programmable Logic Device (CPLD), a digital signal processor (DSP), a Micro Control Unit (MCU) or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the embodiments of the present invention is not limited to the embodiments described above, but also relates to and incorporates all embodiments within the scope of the appended independent claims.

According to another embodiment, a method for a controller is provided, the method comprising:
receiving a first control signal based on a first drain-to-source voltage of a first switch;

receiving a second control signal based on a second drain-to-source voltage of a second switch;
deriving a first switch control signal based on the first control signal and controlling the first switch by providing the first switch control signal to the first switch;
deriving a second switch control signal based on the second control signal and controlling the second switch by providing the second switch control signal to the second switch.

According to another embodiment, a system is provided, the system comprising a controller and a power converter according to any of the preceding embodiments.

What is claimed is:

1. A controller for a power converter, the power converter comprising a first switch and a second switch, the controller comprising: a processor; and
a non-transitory computer-readable storage medium including computer-executable instructions executed by the processor to perform a method comprising: receiving a first control signal based on a first drain-to-source voltage of the first switch; receiving a second control signal based on a second drain-to-source voltage of the second switch; deriving a first switch control signal based on the first control signal and controlling the first switch by providing the first switch control signal to the first switch; deriving a second switch control signal based on the second control signal and controlling the second switch by providing the second switch control signal to the second switch; deriving an additional first control signal and an additional second control signal based on an input voltage Vs and the output voltage Vout of the power converter; deriving at least one turn-on edge of the first switch control signal based on the first in time of the trigger-on edge of the first control signal or the trigger-on edge of the additional first control signal; and deriving at least one turn-on edge of the second switch control signal based on the first in time of the trigger-on edge of the second control signal or the trigger-on edge of the additional second control signal, wherein the first switch control signal and the second switch control signal each comprises turn-on edges and turn-off edges.

2. The instructions according to claim 1, further comprising:
deriving the turn-on edges of the first switch control signal based on trigger-on edges of the first control signal; and
deriving the turn-on edges of the second switch control signal based on trigger-on edges of the second control signal.

3. The instructions according to claim 1, further comprising:
deriving the turn-on edges of the additional first control signal and the turn-on edges of the additional second control signal based on a turn-off-time delay $T_{off\_m}$.

4. The instructions according to claim 3, further comprising:
determining the turn-off-time delay $T_{off\_m}$ based on a predetermined turn-off-time $T_{off}$.

5. The instructions according to claim 4, wherein the turn-off-time delay $T_{off\_m}$ is determined according to the formula $$T_{off\_m} = T_{off} * \mu, \mu > 1,$$

where the predetermined turn-off-time $T_{off}$ is determined according to the formula $$T_{off} = T_{on} * \frac{V_{in}}{(V_{out} - V_{in})}.$$

6. The instructions according to claim 4, further comprising:
deriving at least one turn-off edge of the first switch control signal based on a trigger-on edge of the first control signal and the predetermined turn-on-time $T_{on}$ when the first switch is configured to act as the boost switch; and
deriving at least one turn-off edge of the second switch control signal based on a trigger-on edge of the second control signal and the predetermined turn-on-time $T_{on}$ when the second switch is configured to act as the boost switch.

7. The instructions according to claim 1, further comprising:
receiving a third control signal based on an inductor current of an inductor of the power converter;
deriving at least one turn-off edge of the first switch control signal based on first in time of a trigger-off edge of the third control signal and a trigger-off edge of the additional first control signal when the first switch is configured to act as the freewheeling switch; and
deriving at least one turn-off edge of the second switch control signal based on first in time of a trigger-off edge of the third control signal and a trigger-off edge of the additional second control signal when the second switch is configured to act as the freewheeling switch.

8. A non-transitory computer readable medium storing computer readable instructions executed by the processor for performing a method on a controller, the method comprising the steps of: receiving a first control signal based on a first drain-to-source voltage of a first switch; receiving a second control signal based on a second drain-to-source voltage of a second switch; deriving a first switch control signal based on the first control signal and controlling the first switch by providing the first switch control signal to the first switch; deriving a second switch control signal based on the second control signal and controlling the second switch by providing the second switch control signal to the second switch; deriving an additional first control signal and an additional second control signal based on an input voltage Vin and the output voltage Vout of the power converter; deriving at least one turn-on edge of the first switch control signal based on the first in time of the trigger-on edge of the first control signal or the trigger-on edge of the additional first control signal; and deriving at least one turn-on edge of the second switch control signal based on the first in time of the trigger-on edge of the second control signal or the trigger-on edge of the additional second control signal.

9. A power converter comprising:
an input configured to receive an input voltage $V_{in}$ and an output configured to provide an output voltage $V_{out}$;
an inductor coupled to a first switch and a second switch, wherein the first switch is configured to act as a freewheeling switch when the second switch is configured to act as a boost switch, or vice versa;
a first trigger configured to generate a first control signal based on a first drain-to-source voltage of the first switch and to send the first control signal to a controller,
a second trigger configured to generate a second control signal based on a second drain-to-source voltage of the second switch and to send the second control signal to the controller;

wherein the first switch is further configured to be controlled by a first switch control signal received from the controller, and wherein the second switch is further configured to be controlled by a second switch control signal received from the controller and the first trigger comprises a first comparator configured to generate the first control signal if the first drain-to-source voltage drops below a first drain-to-source threshold, and the second trigger comprises a second comparator configured to generate the second control signal if the second drain-to-source voltage drops below a second drain-to-source threshold.

10. The power converter according to claim 9, wherein the first trigger further comprises a first resistance circuit coupled between the first switch and the first comparator and being configured to reduce the first drain-to-source voltage to the first comparator, and the second trigger comprises a second resistance circuit coupled between the second switch and the second comparator and being configured to reduce the second drain-to-source voltage to the second comparator.

* * * * *